US008650499B2

(12) United States Patent
Aspen

(10) Patent No.: US 8,650,499 B2
(45) Date of Patent: Feb. 11, 2014

(54) SELECTING AND IDENTIFYING VIEW OVERLAY INFORMATION FOR ELECTRONIC DISPLAY

(75) Inventor: Sven Aspen, Sherwood, OR (US)

(73) Assignee: The Boeing Company, Chicago, IL (US)

( * ) Notice: Subject to any disclaimer, the term of this patent is extended or adjusted under 35 U.S.C. 154(b) by 1084 days.

(21) Appl. No.: 11/490,741

(22) Filed: Jul. 21, 2006

(65) Prior Publication Data
US 2008/0022217 A1    Jan. 24, 2008

(51) Int. Cl.
*G06F 3/00* (2006.01)
*G06F 9/00* (2006.01)

(52) U.S. Cl.
USPC ............ 715/764; 715/810; 715/768; 715/825

(58) Field of Classification Search
USPC .................................. 715/764, 810, 768, 825
See application file for complete search history.

(56) References Cited

U.S. PATENT DOCUMENTS

| | | | |
|---|---|---|---|
| 5,265,024 A | | 11/1993 | Crabill et al. |
| 5,592,198 A | | 1/1997 | Fagard et al. |
| 5,692,145 A | | 11/1997 | Nakanishi |
| 5,828,332 A | * | 10/1998 | Frederick .................... 342/26 B |
| 6,088,030 A | * | 7/2000 | Bertram et al. ............... 715/839 |
| 6,112,141 A | | 8/2000 | Briffe et al. |
| 6,199,015 B1 | * | 3/2001 | Curtwright et al. ........... 701/213 |
| 6,227,491 B1 | | 5/2001 | Stephan et al. |
| 6,501,392 B2 | | 12/2002 | Gremmert et al. |
| 6,786,453 B2 | | 9/2004 | Jones |
| 6,842,122 B1 | | 1/2005 | Langner et al. |
| 6,889,938 B1 | | 5/2005 | Nordman |
| 7,013,433 B1 | * | 3/2006 | Schorr et al. .................. 715/825 |
| 7,028,950 B2 | | 4/2006 | Salmon et al. |
| 7,176,937 B2 | * | 2/2007 | Gannon ......................... 345/592 |
| 7,353,091 B2 | * | 4/2008 | Servantie et al. ................. 701/4 |
| 2002/0149599 A1 | * | 10/2002 | Dwyer et al. ................. 345/592 |
| 2003/0142108 A1 | * | 7/2003 | Brown et al. ................. 345/589 |
| 2003/0156046 A1 | | 8/2003 | Dwyer et al. |
| 2005/0251758 A1 | | 11/2005 | Cummins et al. |
| 2005/0288831 A1 | | 12/2005 | Lusardi et al. |
| 2006/0103676 A1 | * | 5/2006 | Schorr et al. .................. 345/629 |
| 2007/0260364 A1 | * | 11/2007 | Dwyer ............................. 701/3 |

FOREIGN PATENT DOCUMENTS

| | | |
|---|---|---|
| EP | 0926652 A1 | 6/1999 |
| EP | 1626251 A | 2/2006 |
| WO | WO 98/10311 | 3/1998 |

OTHER PUBLICATIONS

European Search Report; Date of completion of the search: Nov. 7, 2007; Application No. EP 07 01 3928;.

* cited by examiner

*Primary Examiner* — Tadeese Hailu
*Assistant Examiner* — Darrin Hope
(74) *Attorney, Agent, or Firm* — Harness, Dickey & Pierce, P.L.C.

(57) ABSTRACT

A method of managing the display of overlay information in one or more views. For each overlay item available for display in a current view, it is determined whether the available item has an item type currently selected for display. For each available item having a currently selected item type, the item is included for display in the current view and the type of the item is included for display in a legend. Omitted from the legend are any item type(s) for which no item is included for display in the current view. Overall ease of use of electronic displays can be improved and electronic flight box display screens can be de-cluttered.

17 Claims, 2 Drawing Sheets

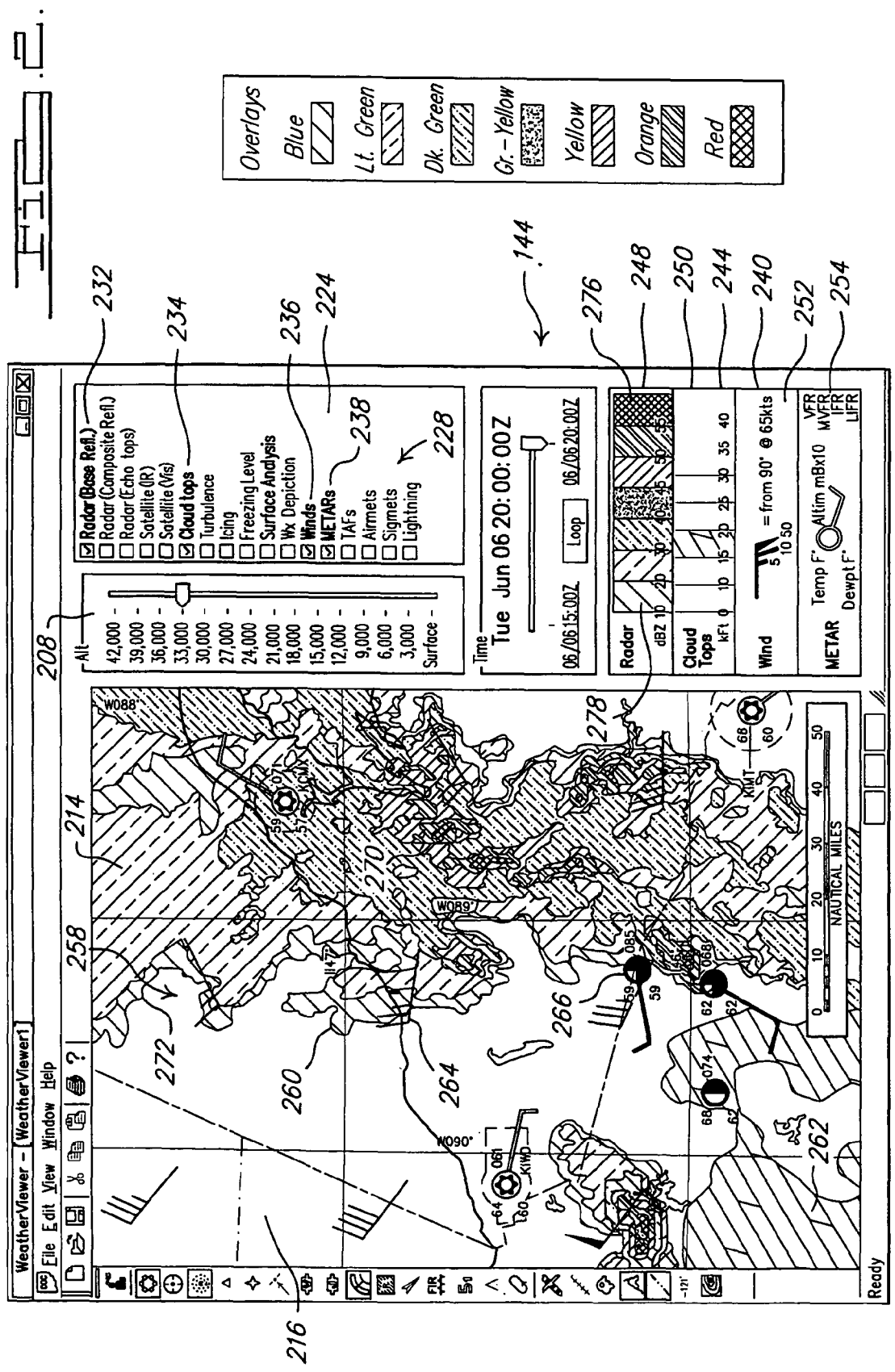

SELECTING AND IDENTIFYING VIEW OVERLAY INFORMATION FOR ELECTRONIC DISPLAY

CROSS-REFERENCE TO RELATED APPLICATIONS

This application is related to U.S. patent application Ser. No. 11/490,742, entitled "Overlaying Information Onto a View For Electronic Display", filed on the same date as this application. The disclosure of the above application is incorporated herein by reference.

FIELD

The present disclosure relates generally to electronically displaying information and more particularly to clarifying the depiction of electronically displayed information.

BACKGROUND

The statements in this section merely provide background information related to the present disclosure and may not constitute prior art.

Electronic displays are available in aircraft whereby pilots can view weather information overlaid on views of aeronautical charts during flight. Various weather phenomena typically are depicted on the charts based on a rich set of visual cues. Different colors are often used to depict values and/or gradients of metrics such as NexRad radar returns, cloud top elevations, turbulence, and icing. Schematic symbols typically are used to represent other phenomena such as current conditions, winds, frontal activity, centers of high and low pressure, lighting strikes, and many others. These symbols and colors, however, are often cryptic in nature, so that sometimes even a seasoned weather analyzer may wish to refer to a legend for exact meanings. Because pilots frequently need to make informed weather-related decisions quickly, it is highly desirable to display important weather information clearly and quickly, without cluttering the display.

SUMMARY

The present disclosure, in one implementation, is directed to a method of managing the display of overlay information in one or more views. For each overlay item available for display in a current view, it is determined whether the available item has an item type currently selected for display. For each available item having a currently selected item type, the item is included for display in the current view and the type of the item is included for display in a legend. The method further includes omitting from the legend any item type for which no item is included for display in the current view.

In another implementation, the disclosure is directed to a method of managing overlay information in a plurality of views for electronic display. The method includes receiving one or more overlay item types selected for display and receiving a selection of a first view. For each item of overlay information available for display in the first view, a type of the item is determined, and if the determined type is included in the one or more selected overlay item types, the available overlay item is included for display in the first view and the determined type is displayed in a legend. The method further includes reconfiguring the legend for a second selected view to include item types only for which at least one overlay item is included for display in the second view.

In yet another implementation, the disclosure is directed to a system for managing the electronic display of overlay information in one or more views. The system includes a processor and memory configured to display, in a current view, each overlay item available for display in the current view and that has an item type currently selected for display. The processor and memory are also configured to display, in a legend for the current view, no item types other than item types selected for display in the current view and for which at least one overlay item is available for display.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a display view of an aeronautical chart with overlay information and a legend in accordance with one implementation of the disclosure.

DETAILED DESCRIPTION OF THE PREFERRED EMBODIMENTS

The following description is merely exemplary in nature and is not intended to limit the present disclosure, application, or uses.

The present disclosure, in one implementation, is directed to a method of managing the display of overlay information in one or more views. Although various implementations are discussed with reference to overlaying weather information onto views of aeronautical charts, the disclosure is not so limited. The disclosure could be implemented in connection with various weather-related applications, including but not limited to television broadcasting of weather maps. Additionally or alternatively, the disclosure could be implemented in connection with navigation-related applications not necessarily involving weather-related information. Such applications could involve, for example, information relating to flight-restricted areas, communication restrictions and/or notification requirements relating to geographical areas, etc. Furthermore, the disclosure can be implemented in connection with applications not necessarily relating to weather or to navigation. The disclosure can be implemented in virtually any environment, including but not limited to air, space, maritime, marine and/or terrestrial environments.

One exemplary implementation of the present disclosure is described below with reference to overlay of weather information onto views of aeronautical charts for display via an electronic flight bag (EFB) system. The disclosure could also be implemented, e.g., in connection with overlaying weather and/or other information onto aeronautical charts for display via aircraft multi-function display (MFD) systems. It should be noted generally that various types of displays and/or display systems, aeronautical or otherwise, could be used in various implementations.

Figure 1:
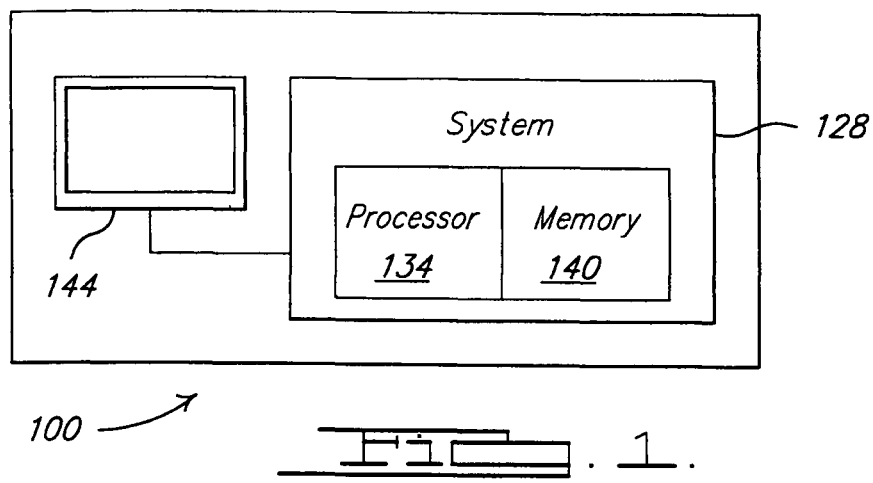
FIG. 1 is a block diagram of an environment in which a system for managing the electronic display of overlay information is used in accordance with one configuration of the present disclosure.

An environment in which a system for managing the electronic display of overlay information is used in accordance with one implementation of the disclosure is indicated generally in FIG. 1 by reference number 100. The environment 100 may be, e.g., an aircraft, a ground system for planning flights, and/or one of many other or additional environments. In the present exemplary implementation, the environment 100 is an aircraft. The aircraft 100 includes a system 128, which in the present example is an electronic flight bag (EFB) system. In various other implementations, the system 128 could be, e.g., a multifunction display (MFD) system. The EFB system 128 may receive information from one or more aircraft systems, e.g., onboard geo-referencing equipment (e.g., Global Positioning System), for use in various applications. The EFB system 128 also may use one or more communications systems of the aircraft 100 to interface with a ground network. The EFB system 128 includes one or more processors 134, one or more memories 140, and one or more displays 144 (one each of which is shown in FIG. 1). The display(s) 144 may be flight-deck-mounted.

The pilot or other user of the EFB system 128 may wish to view weather information relative to an aeronautical chart. In accordance with one implementation of the disclosure, the processor 134 and memory 140 of the EFB system 128 are configured to display an aeronautical chart as one or more views on the display 144. Weather overlay information can be of many different types, including but not limited to images representing NexRad radar returns, turbulence levels, and cloud top elevations.

In one implementation in accordance with the disclosure, weather information may be displayed on the display 144, for example, as shown in FIG. 2. On the display 144 is provided a view selector 208 which allows a pilot or other user of the EFB system 128 to select an aeronautical chart view by altitude. As shown in FIG. 2, at least part of an aeronautical chart 214 is shown in a view 216 corresponding to an altitude of 33,000 feet. A menu 224 is provided whereby the user may select one or more types 228 of overlay items available in the overlay data for display in a view. Types 228 of overlay items shown in FIG. 2 as having been selected from the menu 224 are: base reflection radar returns 232, cloud tops 234, winds 236, and METARs 238.

On the display 144 is also provided a legend 240 indicating the overlay item types 228 selected for display from the menu 224. For the view 216 shown in FIG. 2, legend descriptors 244 consist of a radar scale 248 indicating a range of radar return intensities, a cloud tops scale 250 indicating a range of cloud top elevations, a wind indicator descriptor 252 and a METAR indicator descriptor 254. In the view 216 are displayed various overlay items 258 of the selected types 228, i.e., radar returns 260 of various intensities, various cloud top elevations 262, various wind indicators 264, and various METAR indicators 266.

As may be surmised from the plurality of item types 228 listed in the menu 224, typically a plurality of various weather overlay items 258 are made available in weather overlay data for display in various views. Additionally or alternatively, one or more overlay items 258 not necessarily weather-related could be made available and have types 228 selectable from the menu 224, e.g., restricted fly areas, areas in which communication regulations apply, etc. It can be appreciated that many different items and/or conditions could be displayed as overlay information. Not all available overlay items, however, may be relevant or helpful to a user, e.g., in a given navigational situation. Thus, in accordance with one implementation of the disclosure, the current view 216 shown in FIG. 2 does not include any overlay items for which an overlay item type 228 is not selected from the menu 224. Additionally, the legend 240 does not provide descriptors 244 for overlay item types 228 not selected from the menu 224.

Figure 3:
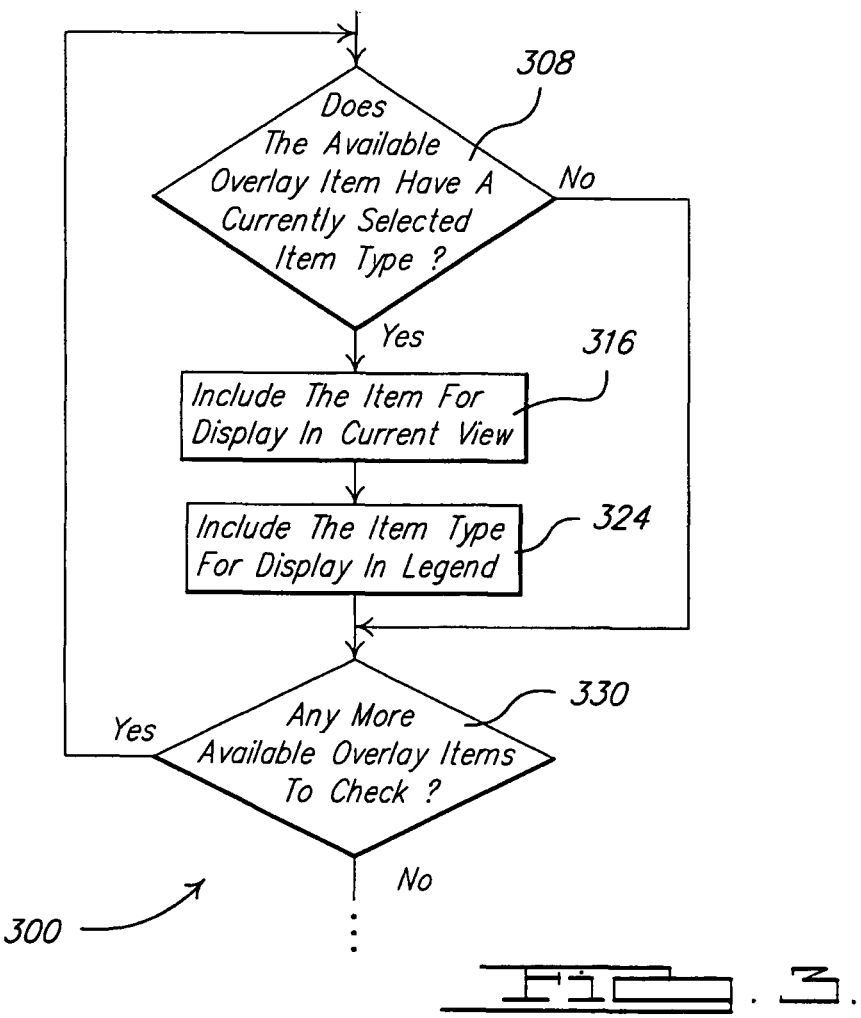
FIG. 3 is a flow diagram of a method of managing the display of overlay information in accordance with one implementation of the disclosure.

A flow diagram of one implementation of a method of managing the display of overlay information, e.g., on the display 144, is indicated generally in FIG. 3 by reference number 300. In the method 300, each overlay item available for display in a current view is checked as follows. In operation 308, an overlay item available for display is checked to determine whether the available item has an item type 228 currently selected, e.g., from the menu 244, for display. If yes, then in operation 316 the overlay item is included for display in the current view, and in operation 324, the item type 228 for the item is included in the legend 240. If in operation 308 it is determined that the item type is not currently selected, then in operation 330 it is determined whether there are any more available overlay items to check. If there are additional items, control returns to operation 308. If all items have been checked, then control proceeds, e.g., to display the current view on the display 144.

It should be noted that an "available" overlay item 258 could be defined in various ways in various implementations. As one example, an available overlay item could be an item that is included in overlay data associated with a given chart and that also would be visible in a given user-selected view. Thus, in some implementations, a given overlay item 258 could be included in weather overlay data associated with a given aeronautical chart but not be available for display, because the overlay item would not be visible in the display of a selected view. Lack of visibility could be, e.g., because the selected view is of a geographical location in the chart that does not include the weather phenomenon described by the given item, and/or because the given overlay would be too small, e.g., in a small-scale (zoomed-out) view to be sufficiently visible. Thus, in some implementations, one or more visibility tests and/or thresholds may be applied to one or more overlay items 258 to determine availability for display at a given view scale and/or chart location.

In various other implementations, availability of an overlay item for display in a selected view may depend on whether the item is included in the overlay data for the selected view regardless of whether, e.g., the item overlay would be too small to be visible at the scale of the selected view. Of course, availability of an overlay item for display could depend on other or additional criteria. As another example and referring to FIG. 1, an overlay item may be determined to be available or unavailable for display based at least in part on a direction in which a mobile platform, e.g., the aircraft 100, is moving. Thus, for example, when the aircraft 100 is headed away from a given weather-related phenomenon, an overlay item depicting the phenomenon would not be displayed, e.g., at a given view scale. As another example and referring to FIG. 2, in an implementation in which an overlay item type 228 for flight-restricted areas is provided in and selected from the menu 224, an overlay item for a given flight-restricted area could be determined as available for display based on whether the aircraft 100 comes within a predetermined mileage range of a restricted area.

Referring again to FIG. 2 and in one implementation, when a new view is selected by the user, e.g., at a scale and/or chart location different from the scale and/or chart location of the current view 216, the processor 134 may check each overlay item in the chart data relating to the new view to determine whether that item is available for display and whether that item has an item type selected from the menu 224. Those items (if any) which are available for display in the new view and which have a selected item type 228 are displayed in the new view. The legend 240 is reconfigured for the new view by the processor 134 to include item types 228 (if any) only for which at least one overlay item is included for display in the new view. Additionally or alternatively, a selection of overlay item types 228 from the menu 224 may be changed by the user, who may find it useful to add and/or deselect overlay item types 228 for display in a given view. In such manner, display contents of each user-selected view, together with the legend 240, can be limited and updated in accordance with the user's selection of overlay item types 228.

Overlay items 258 displayed in various views typically have display characteristics including but not limited to various colors and/or transparencies. In various implementations, the processor 134 and memory 140 are configured to facilitate user interaction with the display 144 by determining a scale of a current view, determining a significance of a given item of overlay information, and updating a display transparency for the overlay item, e.g., from a transparency for the item for a preceding view, based on the current view scale and item significance. Display transparency of a given overlay item may be increased and/or decreased over a plurality of views, depending, e.g., on view scale selected by the pilot or other user of the EFB system 128. Transparency values may be assigned, e.g., using alpha blending based on view scale and overlay item significance as further described in co-pending U.S. patent application Ser. No. 11/490,742, entitled "Overlaying Information Onto a View For Electronic Display", the disclosure of which is incorporated herein by reference.

In some implementations and referring to FIG. 2, when a view is changed and display characteristics such as color and/or transparency are updated for a given overlay item displayed at a different scale in the new view as described in the foregoing U.S. patent application, the legend 240 of the display 144 is also updated. Specifically and for example, a legend descriptor 244 for the type 228 of the given overlay item 258 is updated to display essentially the same display characteristics as those assigned to the given item type 228 in the view. In such manner, the appearance of descriptors 144 in the legend 240 is kept consistent with the appearance of overlay items 258 in the view. Thus, for example, when a new view is selected having a larger scale than that of the previous view, an overlay item having a low significance may appear more transparent in the new view than in the previous view. In such case, the higher transparency level applied to the overlay item in the new view is also applied to the corresponding item type descriptor 244 in the legend 240. As a further example and referring again to FIG. 2, the view 216 is at large scale (i.e., zoomed in compared to other more zoomed-out views of the same chart). As shown in FIG. 2 and in accordance with the disclosure of the above-described U.S. patent application, higher-intensity radar returns 270 are assigned high significances and lower-intensity radar returns 272 are assigned low significances. As can be seen in the view 216, overlay items 270 for higher-significance radar returns are displayed as essentially opaque while overlay items 272 for lower-significance radar returns are essentially transparent. Accordingly, high-intensity values 276 are displayed in the legend 240 as essentially opaque and low-intensity values 278 are displayed as essentially transparent. If the chart 214 were to be zoomed out in one or more subsequent views, transparencies of the radar return overlay items 270 and 272 in the subsequent view(s) could become more opaque as described in the above-described U.S. patent application. In such case, the corresponding transparencies within the radar legend descriptor 248 would also become more opaque so as to accurately portray the overlay items 270 and 272 in the subsequent view(s). Thus the legend 240 can accurately track changing display characteristics of overlay items.

The term "significance" can be used in connection with many different types of overlay information. Levels of significance can represent, for example, levels of intensity of radar returns, turbulence, icing, flyover-restricted areas, etc. A level of significance could be assigned to an item of overlay information to represent, for example, a level of user attention warranted by the item.

The term "current view" may be used to refer to a view that is being configured, or is to be configured, with overlay information for display. The term "current view" may also be used to refer to a view currently being displayed.

In implementations of the present disclosure, an association is established between the context-sensitive legend and the overlay items so that only information pertinent to the user is displayed in the legend. This allows for a dynamic, context-sensitive legend, in contrast to a traditional static legend. Implementations of the disclosure can be extremely useful in aircraft navigation, since airport, navigation aid, airspace, and communications information can be difficult to remember during aircraft navigation.

Implementations of the disclosure can provide an improved user interface that resolves a number of human-machine interface (HMI) issues encountered when using a limited-size display to present large-format map or navigation-type information. Pilots can be aided in identification of weather phenomena, especially in an in-flight environment where manual searching through a large, unabridged legend would not be possible. The disclosure also can be implemented for other types of display systems that face similar issues. Overall ease of use can be improved and display screens can be de-cluttered.

What is claimed is:

1. A method of managing the display of overlay information in one or more views, the method comprising the steps of:
    receiving a user selection of one or more item types from a plurality of item types selectively displayable together in the same geographic chart view on a display;
    receiving a user selection of an altitude from which to represent a current geographic chart view;
    determining whether one or more overlay items are available for display in the current geographic chart view, a given overlay item being available for display if the item is included in the overlay information for the current view and visible if scaled in the current view in accordance with the altitude selected by the user for the current view;
    for each overlay item available for display in the current view, determining whether the available overlay item has an item type currently selected for display; and
    for each available overlay item having a currently selected item type, including the available overlay item for display in the current view;
    displaying an item type of each available overlay item being displayed on the display in a legend, within a subportion of the display, simultaneously, on the display;
    the method further comprising:
        omitting from the legend any currently selected item type for which it is determined in the determining operation that no overlay item is available for display in the current view being displayed on the display; and
        using a processor to alter a transparency of the overlay item being displayed from one intermediate level to a different intermediate level over a plurality of the views preceding the current view, based on at least a current view scale of the current view as selected by the user, and further altering an appearance of the item type corresponding to the overlay item being displayed in the legend such that display characteristics of the item type match those being used on the corresponding overlay item; and the method being performed by a processor configured with memory.

2. The method of claim 1, wherein including the item type for display in a legend comprises using one or more display characteristics associated with the item type and with a scale of the current view to display the item type in the legend.

3. The method of claim 2, wherein using one or more display characteristics comprises using a display color.

4. The method of claim 2, wherein the one or more display characteristics associated with the item type are further associated with one or more significance values.

5. The method of claim 1, further comprising:
receiving a deselection of one or more selected overlay item types; and
omitting the deselected item types from the legend in response to the deselection.

6. A method of managing overlay information in a plurality of views for electronic display, the method comprising:
receiving a user selection of one or more item types from a plurality of item types selectively displayable together in the same view of a geographic chart on a display;
receiving a selection of a first geographic chart view;
determining whether one or more overlay items are included in overlay information displayable in the first view;
for each included overlay item, determining whether the item is available for display in the first view based at least in part on overlay item location relative to a mobile platform represented in the first view; and
for each overlay item determined to be available for display in the first view:
if a type of the item is included in the one or more selected overlay item types, including the available overlay item for display in the first view and displaying the included item type in a legend;
the method further comprising:
determining whether one or more overlay items are included in overlay information displayable in a second selected view;
for each included overlay item for the second view, determining whether the item is available for display in the second view based at least in part on overlay item location relative to the mobile platform as represented in the second view; and
reconfiguring the legend for the second selected view to include selected item types only for which at least one overlay item is determined to be available for display in the second view based at least in part on overlay item location relative to the mobile platform as represented in the second view;
further comprising changing a transparency of the at least one overlay item, as well as a transparency of the item type corresponding to the at least one overlay item in the legend, from one value to a different intermediate value, and in accordance with a change in view scale from the first selected view to the second selected view, as selected by the user, and further such that display characteristics of the item type corresponding to the overlay item being displayed in the legend match those being used on the corresponding overlay item; and the method performed by a processor configured with memory.

7. The method of claim 6, wherein displaying the determined type in a legend comprises using one or more display characteristics associated with the at least one overlay item and with a current view scale to display the determined type.

8. The method of claim 6, wherein the at least one overlay item comprises weather related information.

9. The method of claim 6, further comprising using one overlay item relating to navigation information.

10. A system for managing the electronic display of overlay information in one or more views, the system comprising a graphic display and a processor and memory configured to:
determine whether each of one or more overlay items is available for display in a current geographic chart view, where a given item is available for display if included in the overlay information for the current view and visible in the current view if scaled in accordance with a scale of the current view;
display, in the current view, each overlay item available for display in the current view and that has an item type currently selected for display by a user from a plurality of item types selectively displayable together in the same view;
omit from a legend for the view one or more currently selected item types having only overlay items determined as not available for display in the current view;
modify a transparency from one intermediate level to a different intermediate level of at least one overlay item being displayed from a previous view to the current view, the modifying being done in accordance with a change in view scale; and;
as selected by the user, and further altering an appearance of the item type corresponding to the overlay item being displayed in the legend such that display characteristics of the item type match those being used on the corresponding overlay item.

11. The system of claim 10, wherein the processor and memory are further configured to display the current view and legend on the display.

12. The system of claim 11, wherein the display further comprises a menu for selecting item types.

13. The system of claim 11, wherein the display is included in an electronic flight bag (EFB) system.

14. The system of claim 11, wherein the display is included in a multifunction display (MFD) system.

15. The system of claim 11, wherein the display is included in a flight planning system.

16. The system of claim 10, wherein the processor and memory are further configured to use a direction in which a mobile platform is moving to determine whether an overlay item is available for display.

17. The system of claim 10, wherein the processor and memory are further configured to use a location of a mobile platform to determine whether an overlay item is available for display.

* * * * *